(12) United States Patent
Yamamoto et al.

(10) Patent No.: US 12,169,515 B2
(45) Date of Patent: Dec. 17, 2024

(54) DOCUMENT SEARCH SYSTEM AND DOCUMENT SEARCH METHOD

(71) Applicant: SEMICONDUCTOR ENERGY LABORATORY CO., LTD., Atsugi (JP)

(72) Inventors: Kunitaka Yamamoto, Kanagawa (JP); Junpei Momo, Kanagawa (JP); Kazuki Higashi, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 150 days.

(21) Appl. No.: 17/612,248

(22) PCT Filed: May 11, 2020

(86) PCT No.: PCT/IB2020/054413
§ 371 (c)(1),
(2) Date: Nov. 18, 2021

(87) PCT Pub. No.: WO2020/240312
PCT Pub. Date: Dec. 3, 2020

(65) Prior Publication Data
US 2022/0197935 A1 Jun. 23, 2022

(30) Foreign Application Priority Data

May 24, 2019 (JP) ................. 2019-097468

(51) Int. Cl.
*G06F 16/35* (2019.01)
*G06F 16/93* (2019.01)
*G06F 40/268* (2020.01)

(52) U.S. Cl.
CPC .............. *G06F 16/35* (2019.01); *G06F 16/93* (2019.01); *G06F 40/268* (2020.01)

(58) Field of Classification Search
None
See application file for complete search history.

(56) References Cited

U.S. PATENT DOCUMENTS

2003/0101177 A1* 5/2003 Matsubayashi ..... G06F 16/3347
707/E17.08
2004/0186831 A1* 9/2004 Hiratsuka ............. G06F 16/334
(Continued)

FOREIGN PATENT DOCUMENTS

| JP | 2013-174988 A | 9/2013 |
| JP | 2017-173953 A | 9/2017 |
| JP | 2018-206376 A | 12/2018 |

OTHER PUBLICATIONS

高木徹 et al., "Associative Document Retrieval by Query Theme Analysis", IPSJ SIG Technical Report, May 14, 2004, vol. 2004, No. 45, pp. 91-98, Information Processing Society of Japan.

(Continued)

*Primary Examiner* — Son T Hoang
(74) *Attorney, Agent, or Firm* — Fish & Richardson P.C.

(57) ABSTRACT

A document search system that enables efficient document search regardless of the ability of a user is achieved. Document search is performed using a document search system in which database document data is stored. After first document data and second document data are input to the document search system, the document search system extracts a plurality of terms from the first document data. The extraction of the terms is performed using morphological analysis, for example. Next, the extracted terms are weighted on the basis of the second document data. For example, texts included in a document represented by the second document data are classified into first and second texts. Among the terms extracted from the first document data, the weight of the term included in the first text is set larger than the weights of the other terms. The classification (Continued)

of the texts can be performed in accordance with a rule basis or using machine learning. After that, the similarity of the database document data to the first document data is calculated on the basis of the weighted term.

15 Claims, 12 Drawing Sheets

(56) References Cited

U.S. PATENT DOCUMENTS

| | | | |
|---|---|---|---|
| 2007/0185865 A1* | 8/2007 | Budzik | G06F 16/951 |
| | | | 707/999.005 |
| 2009/0157679 A1* | 6/2009 | Elias | G06F 16/34 |
| 2009/0248678 A1* | 10/2009 | Okamoto | G06F 16/355 |
| | | | 707/999.005 |
| 2010/0257141 A1* | 10/2010 | Monet | G06F 16/93 |
| | | | 707/665 |
| 2014/0304579 A1* | 10/2014 | Foster | G06F 16/23 |
| 2019/0354584 A1* | 11/2019 | Wallenfelt | G06F 16/93 |
| 2019/0384770 A1* | 12/2019 | Lundberg | G06F 16/248 |
| 2020/0193153 A1* | 6/2020 | Lee | G06F 16/93 |
| 2021/0049454 A1 | 2/2021 | Kurokawa | |
| 2022/0004570 A1 | 1/2022 | Okano et al. | |
| 2022/0027799 A1 | 1/2022 | Momo et al. | |

OTHER PUBLICATIONS

新森昭宏 et al., "Aligning Patent Claims with the "Detailed Description" for Readability", Journal of Natural Language Processing, Jul. 10, 2005, vol. 12, No. 3, pp. 111-128.
International Search Report (Application No. PCT/IB2020/054413) Dated Jun. 30, 2020.
Written Opinion (Application No. PCT/IB2020/054413) Dated Jun. 30, 2020.

* cited by examiner

FIG. 4A
S02

| | Extracted term | | | |
|---|---|---|---|---|
| | aaa | bbb | ccc | ddd |
| Weight | 1 | 1 | 1 | 1 |

FIG. 4B1
S03

| | Extracted term | | | |
|---|---|---|---|---|
| | aaa | bbb | ccc | ddd |
| Weight | 1 | 3 | 1 | 1 |

FIG. 4B2
S03

| | Extracted term | | | |
|---|---|---|---|---|
| | aaa | bbb | ccc | ddd |
| Weight | 1 | 3 | 0 | 1 |

FIG. 4C
S04

| | Extracted term | | | | Similarity |
|---|---|---|---|---|---|
| | aaa | bbb | ccc | ddd | |
| DbTD[1] | ○ | × | ○ | ○ | 3 |
| DbTD[2] | ○ | ○ | × | × | 4 |
| ⋮ | | | | | |
| DbTD[n−1] | ○ | ○ | ○ | ○ | 6 |
| DbTD[n] | × | × | × | × | 0 |

FIG. 5A
S04

| | Number of appearances of extracted term | | | | Similarity |
|---|---|---|---|---|---|
| | aaa (Weight:1) | bbb (Weight:3) | ccc (Weight:1) | ddd (Weight:1) | |
| DbTD[1] | 10 | 0 | 3 | 5 | 18 |
| DbTD[2] | 4 | 7 | 0 | 0 | 25 |
| ⋮ | | | | | |
| DbTD[n-1] | 15 | 10 | 20 | 25 | 90 |
| DbTD[n] | 0 | 0 | 0 | 0 | 0 |

FIG. 5B
S04

| | Number of appearances of extracted term | | | | Similarity |
|---|---|---|---|---|---|
| | aaa (Weight:1) | bbb (Weight:3) | ccc (Weight:1) | ddd (Weight:1) | |
| DbTD[1] | 10 | 0 | 3 | 5 | 3 |
| DbTD[2] | 4 | 7 | 0 | 0 | 22 |
| ⋮ | | | | | |
| DbTD[n-1] | 15 | 10 | 20 | 25 | 33 |
| DbTD[n] | 0 | 0 | 0 | 0 | 0 |

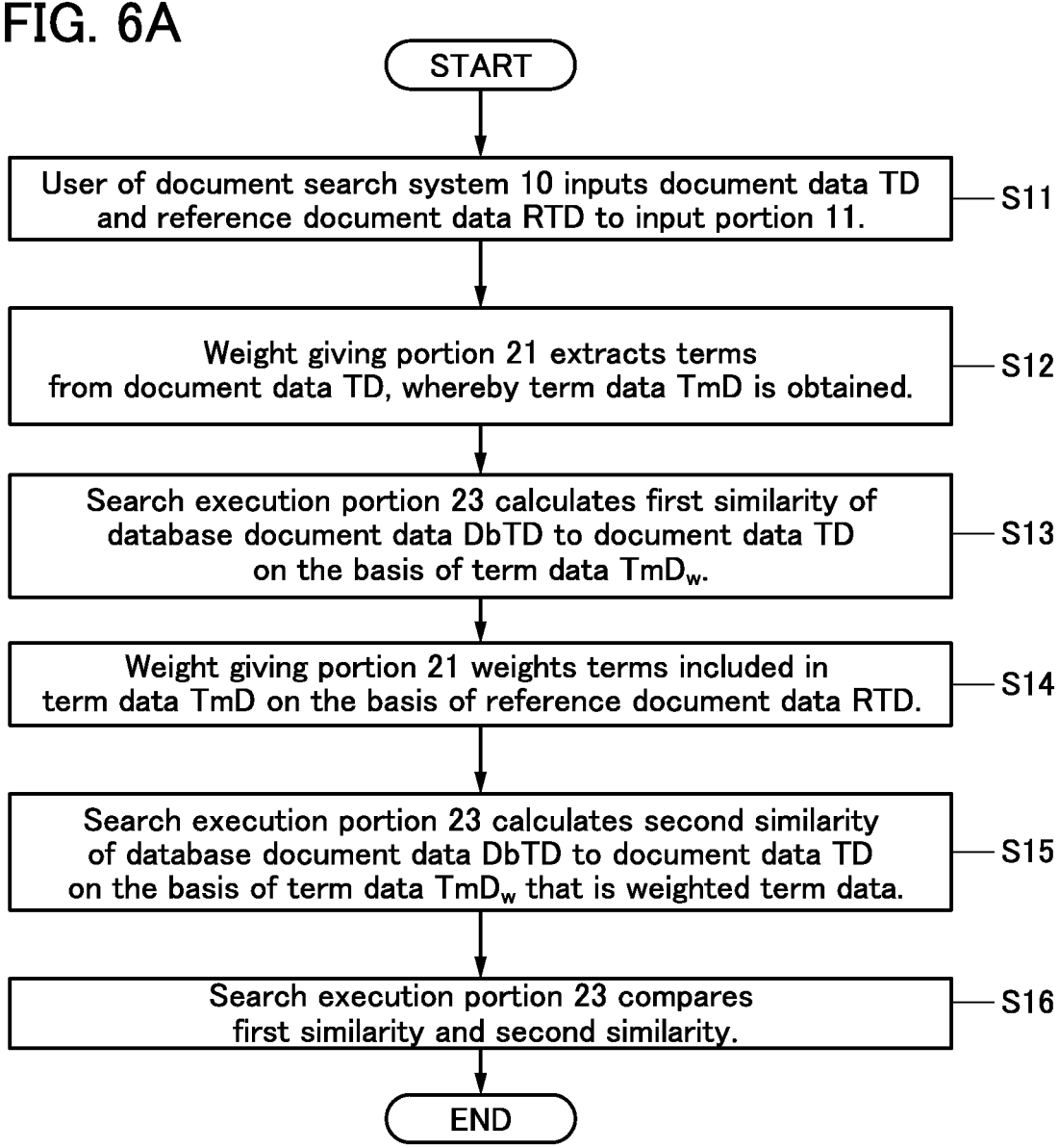

DOCUMENT SEARCH SYSTEM AND DOCUMENT SEARCH METHOD

CROSS REFERENCE TO RELATED APPLICATIONS

This application is a U.S. National Phase Application under 35 U.S.C. § 371 of International Application PCT/IB2020/054413, filed on May 11, 2020, which is incorporated by reference and claims the benefit of a foreign priority application filed in Japan on May 24, 2019, as Application No. 2019-097468.

TECHNICAL FIELD

One embodiment of the present invention relates to a document search system and a document search method.

BACKGROUND ART

Whether a prior art related to an invention that has obtained a patent right exists can be revealed by a search for patent application documents and non-patent documents such as papers published or applied before the filing date of application of the patent right. Domestic or foreign patent documents and non-patent documents such as papers, which are obtained through the search, can be utilized for determining whether there is a possibility of invalidation of the patent right owned by an applicant or whether the patent rights owned by others can be rendered invalidation, for example.

Use of artificial intelligence is under consideration for various applications. In particular, a computer having a higher performance than a conventional Neumann computer is expected to be provided by utilizing machine learning or the like, and in these years, researches on machine learning have been carried out.

For example, Patent Document 1 discloses the invention of searching for information on intellectual property similar to input document data using an artificial neural network (hereinafter referred to as a neural network).

REFERENCE

Patent Document

[Patent Document 1] Japanese Published Patent Application No. 2018-206376

SUMMARY OF THE INVENTION

Problems to be Solved by the Invention

When a search for prior art documents or the like is performed to inspect grounds for invalidation of a patent, for example, it is necessary to form a retrieval expression mainly based on an invention defined by a scope of claims. An improvement in quality of the retrieval expression is expected by grasping the invention and a prosecution history; however, it takes time because experience and comprehension of a searcher are required.

An object of one embodiment of the present invention is to provide a document search system that enables efficient document search regardless of the ability of a searcher. Alternatively, an object of one embodiment of the present invention is to provide a document search system that enables document search with a simple method. Alternatively, an object of one embodiment of the present invention is to provide a document search system that enables highly accurate document search. Alternatively, an object of one embodiment of the present invention is to provide a novel document search system.

An object of one embodiment of the present invention is to provide a document search method that enables efficient document search regardless of the ability of a searcher. Alternatively, an object of one embodiment of the present invention is to provide a document search method that enables document search with a simple method. Alternatively, an object of one embodiment of the present invention is to provide a document search method that enables highly accurate document search. Alternatively, an object of one embodiment of the present invention is to provide a novel document search method.

Note that the description of a plurality of objects does not preclude the existence of each object. One embodiment of the present invention does not necessarily achieve all the objects described as examples. Furthermore, objects other than those listed are apparent from description of this specification, and such objects can be objects of one embodiment of the present invention.

Means for Solving the Problems

One embodiment of the present invention is a document search system including a database and a processing portion. The database has a function of storing database document data; the processing portion has a function of extracting a plurality of terms from first document data; the processing portion has a function of weighting at least one of the extracted terms on the basis of second document data; and the processing portion has a function of calculating the similarity of the database document data to the first document data on the basis of the weighted term.

Alternatively, in the above embodiment, the processing portion may have a function of classifying texts included in a document represented by the second document data into a first text and a second text, and the processing portion may have a function of setting the weight of the term included in the first text larger than the weight of the term not included in the first text among the terms extracted from the first document data.

Alternatively, in the above embodiment, the processing portion may have a function of performing machine learning, and the processing portion may have a function of performing the classification of the texts on the basis of a learning result of the machine learning.

Alternatively, in the above embodiment, first learning document data may be input to the processing portion and then the machine learning may be performed so that data output from the processing portion is close to second learning document data; the first learning document data may be the same kind of document data as the second document data; and the second learning document data may be document data obtained by labeling the first learning document data.

Alternatively, in the above embodiment, the processing portion may have a function of extracting the terms using morphological analysis.

Alternatively, one embodiment of the present invention is a method for searching for a document using a document search system in which database document data is stored. The method includes inputting first document data and second document data to the document search system and then extracting a plurality of terms from the first document data; weighting at least one of the extracted terms on the basis of the second document data; and calculating the similarity of the database document data to the first document data on the basis of the weighted term.

Alternatively, in the above embodiment, after the terms are extracted, texts included in a document represented by the second document data may be classified into a first text and a second text, and the weighting may be performed so that the weight of the term included in the first text is larger than the weight of the term not included in the first text among the terms extracted from the first document data.

Alternatively, in the above embodiment, the classification of the texts may be performed using machine learning.

Alternatively, in the above embodiment, first learning document data may be input to the processing portion having a function of performing processing using the machine learning and then the machine learning may be performed so that data output from the processing portion is close to second learning document data; the first learning document data may be the same kind of document data as the second document data; and the second learning document data may be document data obtained by labeling the first learning document data.

Alternatively, in the above embodiment, the extraction of the term may be performed using morphological analysis.

Effect of the Invention

According to one embodiment of the present invention, a document search system that enables efficient document search regardless of the ability of a searcher can be provided. According to one embodiment of the present invention, a document search system that enables highly accurate document search can be provided. According to one embodiment of the present invention, a novel document search system can be provided.

According to one embodiment of the present invention, a document search method that enables efficient document search regardless of the ability of a searcher can be provided. According to one embodiment of the present invention, a document search method that enables highly accurate document search can be provided. According to one embodiment of the present invention, a novel document search method can be provided.

Note that description of the plurality of effects does not preclude the existence of other effects. One embodiment of the present invention does not necessarily achieve all the effects described as examples. In one embodiment of the present invention, other objects, effects, and novel features will be apparent from the description of the specification and the drawings.

BRIEF DESCRIPTION OF THE DRAWINGS

FIG. 4A, FIG. 4B1, FIG. 4B2, and FIG. 4C are tables for describing an example of a document search method.

FIG. 5A and FIG. 5B are tables for describing an example of a document search method.

FIG. 6A is a flow chart for describing an example of a document search method. FIG. 6B is a table for describing an example of a document search method.

MODE FOR CARRYING OUT THE INVENTION

Figure 1:
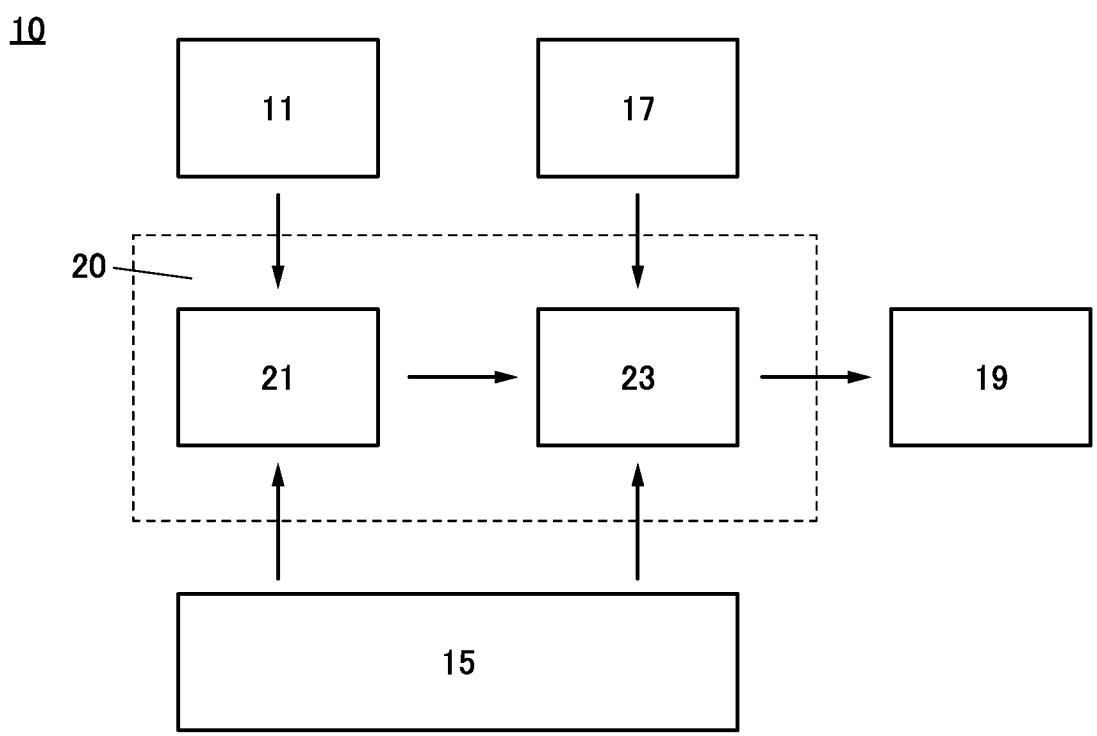
FIG. 1 is a block diagram showing an example of a document search system.

An embodiment of the present invention will be described below. Note that one embodiment of the present invention is not limited to the following description, and it will be readily appreciated by those skilled in the art that modes and details of the present invention can be modified in various ways without departing from the spirit and scope of the present invention. One embodiment of the present invention therefore should not be construed as being limited to the following description of the embodiments.

Note that ordinal numbers such as "first", "second", and "third" in this specification and the like are used in order to avoid confusion among components. Thus, the terms do not limit the number of components. In addition, the terms do not limit the order of components. In this specification and the like, for example, a "first" component can be referred to as a "second" component in a scope of claims. In this specification and the like, for example, a "first" component can be omitted in a scope of claims.

Moreover, when a plurality of components are denoted by the same reference numerals, and, in particular, need to be distinguished from each other, an identification sign such as "[1]", "[2]", or "[n]" is sometimes added to the reference numerals.

Embodiment

In this embodiment, a document search system and a document search method of embodiments of the present invention will be described with reference to FIG. 1 to FIG. 12.

In this embodiment, a document search system that can be used for a search for intellectual property is described as an example of the document search system, and a document search method using the document search system is described. Note that not being limited to use of a search for intellectual property, the document search system of one embodiment of the present invention can be used for other searches than intellectual property.

In the document search method of one embodiment of the present invention, first, a user of the document search system of one embodiment of the present invention inputs first document data and second document data to the document search system of one embodiment of the present invention. The first document data can be document data representing a document describing an invention, and the second document data can be document data representing, for example, a document discussing and explaining the contents described in the document represented by the first document data. For example, the second document data can be document data representing the feature of the invention described in the document represented by the first document data. For example, when the first document data represents a scope of claims of patent application, the second document data can represent a written opinion against the reasons for refusal of the patent application.

When the first and second document data are input to the document search system of one embodiment of the present invention, the document search system extracts a plurality of terms from the first document data. For example, morphological analysis is performed on the first document data, whereby a plurality of terms can be extracted.

Next, the document search system weights each of the terms extracted from the first document data on the basis of the second document data. For example, texts included in the document represented by the second document data are classified into a first text and a second text. For example, when the first document data represents a scope of claims of patent application and the second document data represents a written opinion against the reasons for refusal as described above, the first text can be a text representing the feature of an invention asserted to avoid the reasons for refusal of the patent application of the first document data. In this case, for example, the second text can be texts other than the first text in the document represented by the second document data. Here, the classification into the first text and the second text can be performed in accordance with a rule basis or using machine learning, for example.

In this specification and the like, a word "text" means a group of letters organizing contents. In addition, a word "document" means a medium including a text. For example, a patent document (e.g., a published application publication and a patent publication), a paper, a notice of reasons for refusal, a written opinion, and the like are documents. Moreover, for example, a scope of claims, a specification, and an abstract included in a patent document can each be called a document. Note that a "document" may include a drawing, an image, or the like in addition to a text.

Among the terms extracted from the first document data, the weight of the term included in the first text is set larger than the weight of the term not included in the first text. That is, the weight of the term included in the first text is set larger than the weight of the term included in not the first text but the second text and the weight of the term included in neither the first text nor the second text.

After that, the similarity of database document data, which is document data stored in a database, to the first document data is calculated on the basis of the weighted term. For example, whether the term extracted from the first document data and weighted by the above-described method is included in the database document data is determined. In the case where the term extracted from the first document data and weighted is included in the database document data, the weight of the term is used as a score. In the case where the term extracted from the first document data and weighted is not included in the database document data, the score is 0. The above-described determination and score calculation are performed on all of the terms extracted from the first document data, for example. The sum of the scores can be used as the similarity of the database document data to the first document data. In other words, for example, the sum of the weights of the terms that are extracted from the first document data and included in the database document data can be used as the similarity of the database document data to the first document data.

By calculating the similarity by the above-described method, the similarity reflecting the feature of the invention or the like described in the document represented by the first document data can be obtained compared to the case of not weighting the terms extracted from the first document data, for example. Thus, efficient document search can be performed regardless of the ability of a user, who is a searcher, of the document search system of one embodiment of the present invention.

<1. Structure Example of Document Search System>

In this embodiment, a document search system that can be used for a search for intellectual property is described as an example of the document search system. Note that not being limited to use of a search for intellectual property, the document search system of one embodiment of the present invention can be used for other searches than intellectual property.

FIG. 1 is a block diagram showing a structure example of a document search system 10 that is the document search system of one embodiment of the present invention. In FIG. 1, the arrow indicates the flow of data or the like. Note that the flow of data or the like shown in FIG. 1 is an example, and data or the like may flow in a direction not indicated by the arrow.

Although a block diagram in which components are classified by their functions and shown as independent blocks is shown in the drawing attached to this specification, it is difficult to completely separate actual components according to their functions and one component can relate to a plurality of functions. In addition, one function can relate to a plurality of components FIG. 1 is a block diagram showing a structure example of the document search system 10. The document search system 10 includes at least a processing portion 20, and the processing portion 20 includes a weight giving portion 21 and a search execution portion 23. The document search system 10 can include an input portion 11, a memory portion 15, a database 17, and an output portion 19 as well as the processing portion 20. Note that the weight giving portion 21, the search execution portion 23, the input portion 11, the memory portion 15, the database 17, and the output portion 19 may be provided in a PC (Personal Computer) of a user of the document search system 10 or a server connected to the PC through a network. For example, one or some of the weight giving portion 21, the search execution portion 23, the input portion 11, the memory portion 15, the database 17, and the output portion 19 may be provided in a PC of a user of the document search system 10, and the rest may be provided in a server connected to the PC through a network.

Data is input to the input portion 11. For example, the user of the document search system 10 can input data to the input portion 11. The data input to the input portion 11 can be supplied to the weight giving portion 21. The data input to the input portion 11 may be supplied to the search execution portion 23, the memory portion 15, the database 17, or the like. Part of the data input to the input portion 11 may be supplied to the weight giving portion 21, the search execution portion 23, the memory portion 15, the database 17, or the like.

The memory portion 15 has a function of storing a program to be executed by the processing portion 20. The memory portion 15 may have a function of storing the result of processing by the processing portion 20, data input to the input portion 11, and the like.

The memory portion 15 includes at least one of a volatile memory and a nonvolatile memory. For example, the memory portion 15 may include a volatile memory such as a DRAM or an SRAM. For example, the memory portion 15 may include a resistance change memory typified by a ReRAM (Resistive Random Access Memory) or the like, a magnetoresistive memory typified by a PRAM (Phase change Random Access Memory), a FeRAM (Ferroelectric Random Access Memory), an MRAM (Magnetoresistive Random Access Memory) or the like, or a nonvolatile memory such as a flash memory. The memory portion 15 may include storage media drives such as a hard disk drive (Hard Disc Drive: HDD) and a solid state drive (SSD).

The database 17 has a function of storing at least database document data that is a search target. The database 17 may have a function of storing the result of processing by the processing portion 20, data input to the input portion 11, and the like. Note that the memory portion 15 and the database 17 are not necessarily separated from each other. For example, the document search system 10 may include a memory unit that has both the functions of the memory portion 15 and the database 17.

The processing portion 20 has a function of performing processing such as arithmetic operation or inference with use of data or the like supplied from the input portion 11, the memory portion 15, the database 17, and the like. The processing portion 20 has a function of supplying the processing result to the output portion 19. The processing portion 20 may have a function of supplying the processing result to the memory portion 15, the database 17, or the like.

Specifically, in the processing portion 20 including the weight giving portion 21 and the search execution portion 23, the weight giving portion 21 has a function of performing processing using data or the like supplied from the input portion 11 and the memory portion 15. The search execution portion 23 has a function of performing search processing using the result of the processing by the weight giving portion 21 and data or the like supplied from the input portion 11, the memory portion 15, and the database 17. The result of the search by the search execution portion 23 can be supplied to the output portion 19. Specific processing contents that can be performed by the weight giving portion 21 and the search execution portion 23 will be described later.

The processing portion 20 includes, for example, an operation circuit, a central processing unit (CPU), or the like.

The processing portion 20 may include a microprocessor such as a DSP (Digital Signal Processor) or a GPU (Graphics Processing Unit). The microprocessor may be composed of a PLD (Programmable Logic Device) such as an FPGA (Field Programmable Gate Array) or an FPAA (Field Programmable Analog Array). The processing portion 20 can interpret and execute instructions from various programs with the use of a processor to process various kinds of data and control programs. The programs to be executed by the processor are stored in at least one of a memory region of the processor or the memory portion 15.

The processing portion 20 may include a main memory. The main memory includes at least one of a volatile memory such as a RAM (Random Access Memory) and a nonvolatile memory such as a ROM (Read Only Memory).

A DRAM (Dynamic Random Access Memory), an SRAM (Static Random Access Memory), or the like is used as the RAM, for example, and a memory space is virtually assigned as a work space for the processing portion 20 to be used. An operating system, an application program, a program module, program data, a look-up table, and the like which are stored in the memory portion 15 are loaded into the RAM and executed. The data, program, and program module which are loaded into the RAM are each directly accessed and operated by the processing portion 20.

In the ROM, a BIOS (Basic Input/Output System), firmware, and the like for which rewriting is not needed can be stored. As the ROM, a mask ROM, an OTPROM (One Time Programmable Read Only Memory), an EPROM (Erasable Programmable Read Only Memory), and the like can be given. As the EPROM, a UV-EPROM (Ultra-Violet Erasable Programmable Read Only Memory) which can erase stored data by ultraviolet irradiation, an EEPROM (Electrically Erasable Programmable Read Only Memory), a flash memory, and the like can be given.

The output portion 19 has a function of outputting data of the document search system 10. Specifically, for example, the result of the processing by the processing portion 20 can be output. For example, the result of the search by the search execution portion 23 may be displayed on a display device or the search result may be output in a form of an electronic file.

<2. Document Search Method 1>

Figure 2:
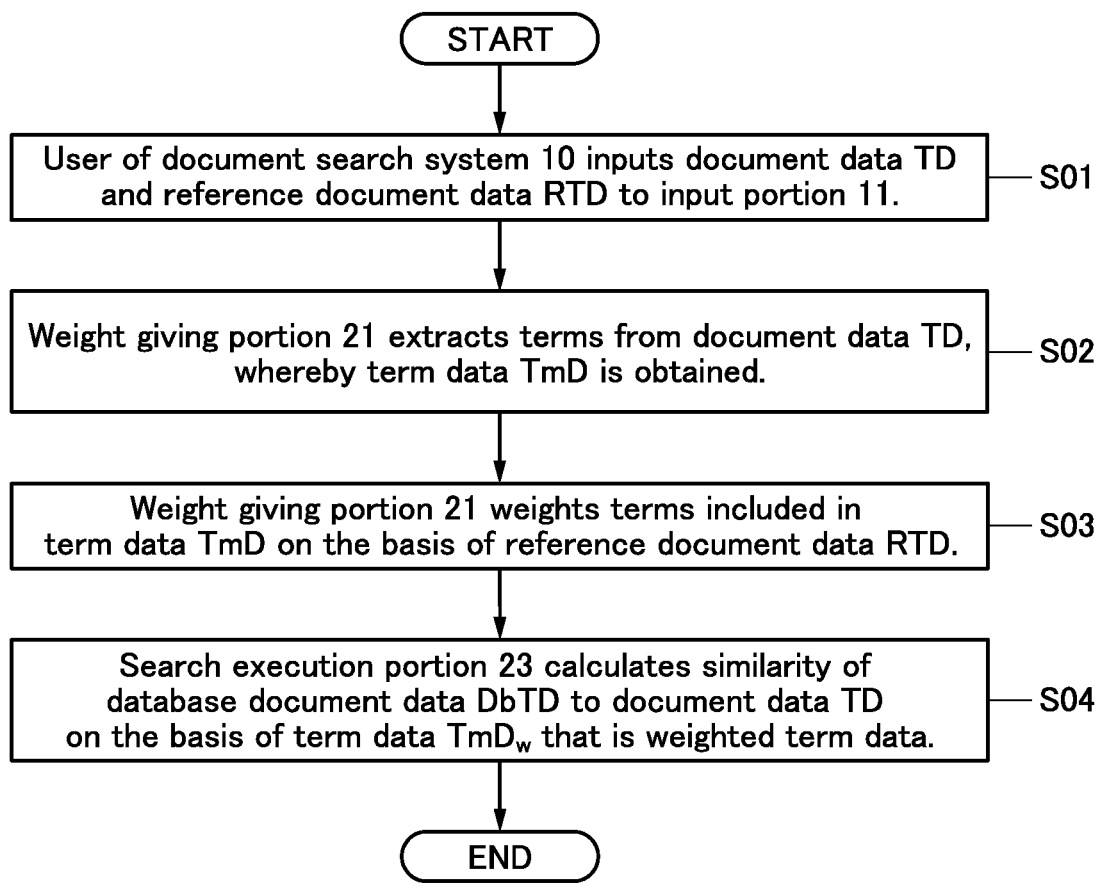
FIG. 2 is a flow chart for describing an example of a document search method.
Figure 3:
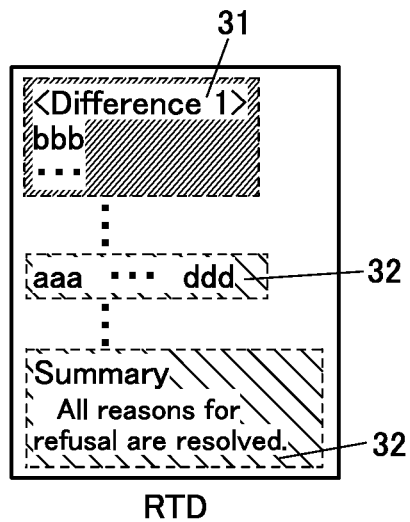
FIG. 3 is a schematic view for describing an example of a document search method.
Figure 7A:
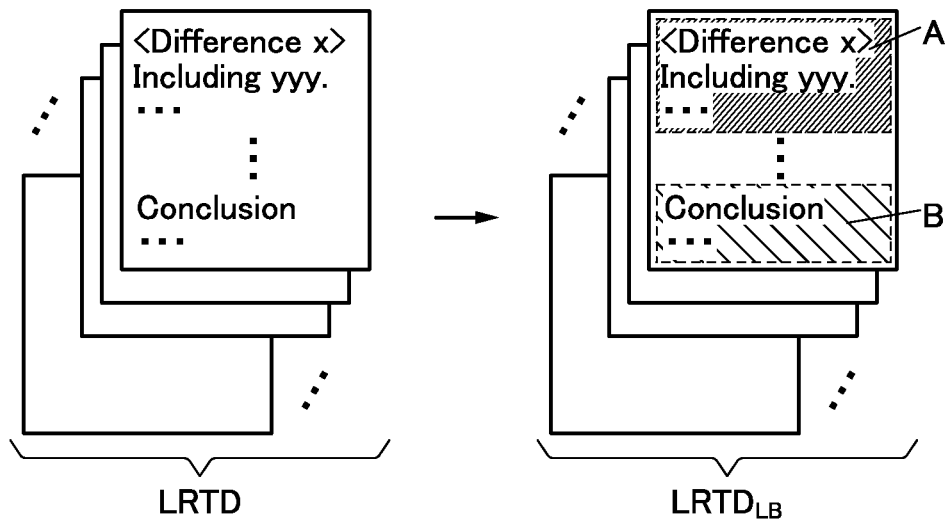
FIG. 7A and FIG. 7B are schematic views for describing an example of a document search method.
Figure 7B:
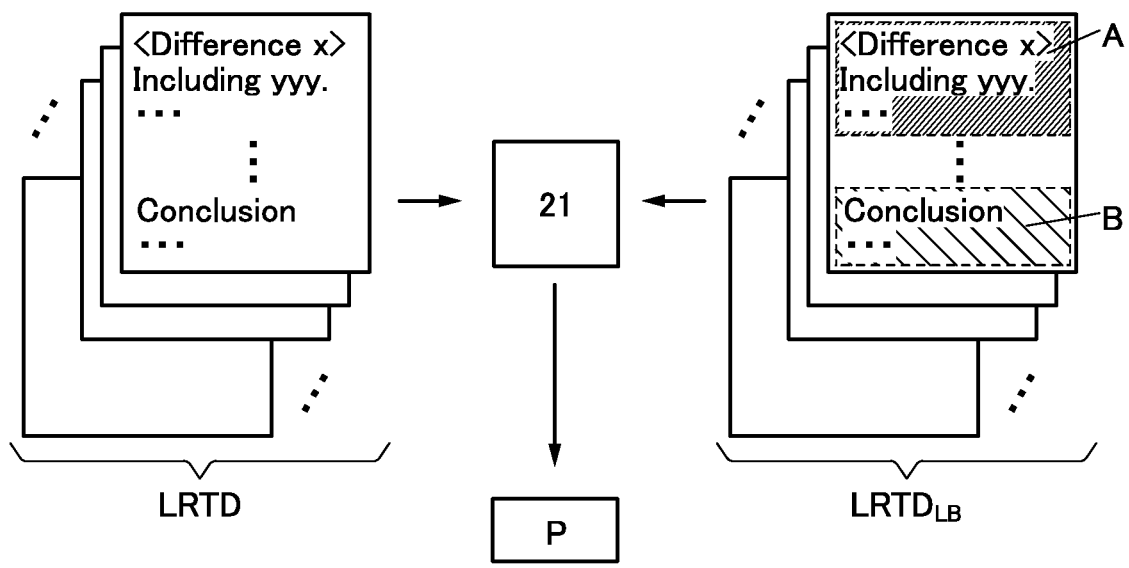
Figure 8:
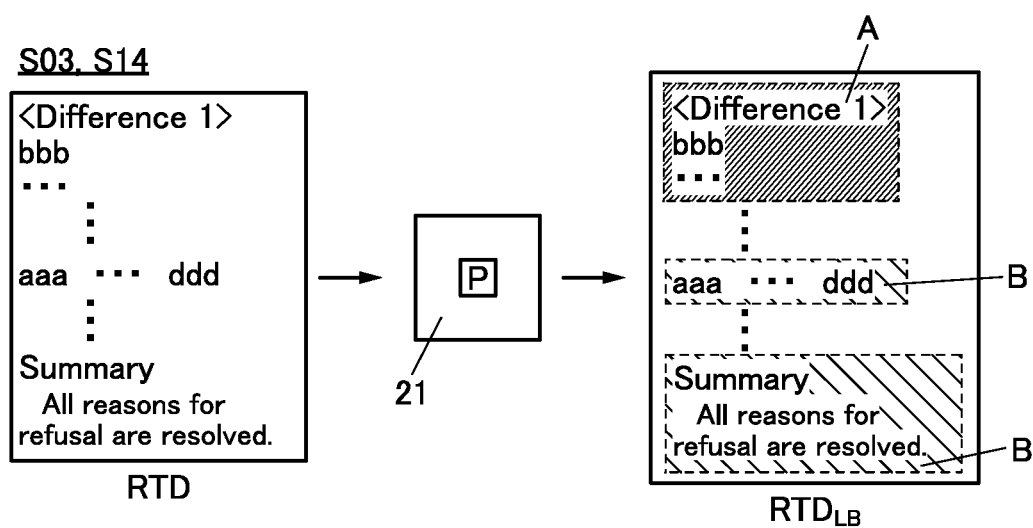
FIG. 8 is a schematic view for describing an example of a document search method.

A document search method using the document search system 10 is described. FIG. 2 is a flow chart showing an example of a document search method using the document search system 10. FIG. 3 is a schematic view describing an operation of Step S01 shown in FIG. 2. FIG. 4A is a schematic view describing an operation of Step S02 shown in FIG. 2. FIG. 4B1 and FIG. 4B2 are schematic views describing an operation of Step S03 shown in FIG. 2. FIG. 4C, FIG. 5A, and FIG. 5B are schematic views describing an operation of Step S04 shown in FIG. 2.

[Step S01]

First, the user of the document search system 10 inputs document data TD and reference document data RTD to the input portion 11. The document data TD and the reference document data RTD may be input at the same time or may be input separately.

The document data TD and the reference document data RTD may be supplied from the input portion 11 to the weight giving portion 21.

The document data TD includes, for example, documents or the like describing inventions, devices, designs, industrial products before sale, technical information, or technical thought. In particular, it is possible to use documents or the like describing a scope of claims, an abstract, or summary of the invention as the document data TD. Since the text volume of such document is lower than the full text of the specification, characteristic keywords included in the document data TD are easily extracted.

The reference document data RTD can be document data representing, for example, a document discussing and explaining the contents described in the document represented by the document data TD. For example, the reference document data RTD can be document data representing the feature of the invention or the like described in the document represented by the document data TD. In a written opinion, for example, the feature of an invention or the like of patent application or the like is described to argue against the reasons for refusal of the patent application or the like. Specifically, in the case where a point differentiated from a reference is described in a written opinion to resolve reasons for refusal such as violation of novelty and violation of an inventive step, for example, the differentiated point can be the feature of an invention or the like of patent application. Thus, the reference document data RTD can be a written opinion against reasons for refusal of patent application or the like of the document data TD, for example. Alternatively, in the case where an opposition to a patent or the like of the document data TD is raised, the reference document data RTD can be a written opinion against reasons for objection such as violation of novelty and violation of an inventive step.

Alternatively, in the case where a trial for invalidation of a patent or the like of the document data TD is filed, the reference document data RTD can be a written answer against grounds for invalidation such as violation of novelty and violation of an inventive step. Alternatively, in the case where the feature of the invention or the like described in the document represented by the document data TD is described in a petition, the reference document data RTD can be the petition. In FIG. 3, the document data TD is a scope of claims and the reference document data RTD is a written opinion. Also in the following description, the document data TD is a scope of claims and the reference document data RTD is a written opinion against the notice of reasons for refusal of patent application of the document data TD.

In the document search method using the document search system 10, database document data can be searched for document data similar to the document data TD in consideration of the reference document data RTD.

[Step S02]

Next, the weight giving portion 21 extracts terms from the document data TD, whereby term data TmD is obtained. The terms are extracted by performing morphological analysis on the document data TD, for example. Among the extracted terms, a noun can be determined as a term included in the term data TmD, for example; all nouns can be determined as terms included in the term data TmD, for example. FIG. 4A shows an example in which terms "aaa", "bbb", "ccc", and "ddd" are extracted from the document data TD and the terms are included in the term data TmD. Note that a weight will be described later.

Here, a "term" extracted from the document data TD or the like can be a divided minimum unit as a morpheme such as a "noun", a "verb", and a "postpositional particle", for example. Alternatively, one "term" may be formed of two or more words. Alternatively, a clause may be a "term".

[Step S03]

Next, the weight giving portion 21 weights the terms included in the term data TmD on the basis of the reference document data RTD. The weighted term data is term data $TmD_w$. For example, texts included in a document represented by the reference document data RTD are classified into a first text and a second text, and the weight of the term included in the first text is set larger than the weight of the term not included in the first text. That is, the weight of the term included in the first text is set larger than the weight of the term included in not the first text but the second text and the weight of the term included in neither the first text nor the second text. Note that the texts included in the document represented by the reference document data RTD may be classified into first to third texts. In this case, the weight of the term included in the first text can be set larger than the weight of the term included in not the first text but the second text. Furthermore, the weight of the term included in not the first text but the second text can be set larger than the weight of the term included in neither the first text nor the second text. Note that the texts included in the document represented by the reference document data RTD may be classified into first to k-th texts (k is an integer greater than or equal to 2).

Here, among the texts included in the document represented by the reference document data RTD, a first text can be a text strongly representing the feature of the invention or the like of the document data TD, and a second text can be the other texts, for example. On the assumption that the document data TD is a scope of claims and the reference document data RTD is a written opinion against reasons for refusal, for example, among the texts included in the reference document data RTD, the first text can be a text strongly representing the feature or the like of the invention to avoid the reasons for refusal of patent application of the document data TD. For example, the first text can be a text, a paragraph, or the like including a word "difference", "not disclosed", or "different". Classification of texts included in reference document data can be performed in accordance with a rule basis using such a certain term as a keyword.

Note that the first text included in the reference document data RTD is not necessarily one continuous text. That is, the reference document data RTD may include a plurality of first texts. The same applies to the second to k-th texts.

FIG. 3 shows an example in which the term "bbb" is included in a first text 31 and the term "aaa" and the term "ddd" are included in a second text 32. FIG. 4B1 shows an example in which among the terms included in the term data TmD (the terms extracted from the document data TD in Step S02), the weight of the term "bbb" included in the first text 31 is set larger than the weights of the other terms.

For example, a description is made on an example of a method for calculating the weights of the terms included in the term data TmD in the case where the texts included in the document represented by the reference document data RTD are classified into the first text 31 and the second text 32. Among the terms included in the term data TmD, the weight of the term not included in the first text 31 is 1. The weight of the term included in the first text 31 is calculated by the following formula. Here, the weight of the term included in the first text 31 is W, the number of terms included in the term data TmD is N, and among the terms included in the term data TmD, the number of terms included in the first text 31 is $N_{ftr}$.

[Formula 1]

$$W = \frac{N - N_{ftr}}{N_{ftr}} \quad (1)$$

According to the calculation of the weight of the term included in the first text 31 by Formula 1, the larger the number N of terms included in the term data TmD is, the larger the weight of the term included in the first text 31 is. In addition, among the terms included in the term data TmD, the smaller the number $N_{ftr}$ of terms included in the first text 31 is, the larger the weight of the term included in the first text 31 is.

FIG. 4B1 shows an example in which the weight of the term "bbb" is calculated by Formula 1. In Formula 1, N is 4 and $N_{ftr}$ is 1, so that the weight W is 3.

Among the terms included in the term data TmD, the weight of the term included in neither the first text 31 nor the second text 32 may be set smaller than the weight of the term included in not the first text 31 but the second text 32. FIG. 4B2 shows an example in which the weight of the term "ccc" included in neither the first text 31 nor the second text 32 shown in FIG. 3 is 0 and the weights of the term "aaa" and the term "ddd" that are included in not the first text 31 but the second text 32 are 1.

[Step S04]

Then, the search execution portion 23 calculates the similarity of database document data DbTD to the document data TD on the basis of the term data $TmD_w$ that is the term data weighted in Step S03. For example, whether the term included in the term data $TmD_w$ is included in the database document data DbTD is determined. In the case where the term included in the term data $TmD_w$ is included in the database document data DbTD, the weight of the term is used as a score. In the case where the term included in the term data $TmD_w$ is not included in the database document data DbTD, the score is 0. The above-described determination and score calculation are performed on all of the terms included in the term data $TmD_w$, for example. The sum of the scores can be used as the similarity of the database document data DbTD to the document data TD. In other words, for example, the sum of the weights of the terms that are included in the database document data DbTD among the terms included in the term data $TmD_w$, can be used as the similarity of the database document data to the document data TD. The above-described method for calculating the similarity is represented by the following formula. Here, the similarity of the database document data DbTD to the document data TD is SIM, the number of terms included in the term data $TmD_w$ is m, and the weight of an i-th term is $W_i$. Moreover, $Y_i$ is 1 when the i-th term is included in the database document data DbTD, and $Y_i$ is 0 when the i-th term is not included in the database document data DbTD.

[Formula 2]

$$SIM = \sum_{i=1}^{m} W_i Y_i \qquad (2)$$

FIG. 4C shows an example of the calculation results of the similarities of database document data DbTD[1] to database document data DbTD[n] (n is an integer greater than or equal to 1) to the document data TD. Here, the terms included in the term data $TmD_w$ and the weights thereof are as shown in FIG. 4B1. In FIG. 4C, the terms included in the database document data DbTD are denoted by "○", and the terms not included in the database document data DbTD are denoted by "x".

In the example shown in FIG. 4C, the database document data DbTD[1] includes the terms "aaa", "ccc", and "ddd" and does not include the term "bbb". Since the weights of the terms "aaa", "ccc", and "ddd" are all 1, the similarity of the database document data DbTD[1] to the document data TD can be 3. In addition, the database document data DbTD[2] includes the terms "aaa" and "bbb" and does not include the terms "ccc" and "ddd". Since the weight of the term "aaa" is 1 and the weight of the term "bbb" is 3, the similarity of the database document data DbTD[2] to the document data TD can be 4.

The database document data DbTD[n−1] includes all of the terms "aaa", "bbb", "ccc", and "ddd". Since the weights of the terms "aaa", "ccc", and "ddd" are 1 and the weight of the term "bbb" is 3, the similarity of the database document data DbTD[n−1] to the document data TD can be 6. Furthermore, the database document data DbTD[n] includes none of the terms "aaa", "bbb", "ccc", and "ddd". In this case, the similarity of the database document data DbTD[n] to the document data TD can be 0.

Note that it is possible that determination of whether the term included in the term data $TmD_w$ is included is not performed on all the texts included in the database document data DbTD but performed on one or some texts included in the database document data DbTD. For example, the determination of whether the term included in the term data $TmD_w$ is included may be performed only on a text representing the spirit of the invention among the texts included in the database document data DbTD. Alternatively, for example, the determination of whether the term included in the term data $TmD_w$ is included may be performed only on texts other than a text representing bibliographic information among the texts included in the database document data DbTD.

Even when the same term appears a plurality of times in the database document data DbTD, the number of appearances is not taken into consideration in the calculation of the similarity in the example shown in FIG. 4C; however, the number of appearances may be taken into consideration. The product of the number of appearances of the term included in the term data $TmD_w$ and the weight of the term is used as a score, for example. The above-described score calculation is performed on all of the terms included in the term data $TmD_w$, for example. The sum of the scores can be used as the similarity of the database document data DbTD to the document data TD. The above-described method for calculating the similarity is represented by the following formula. Here, the similarity of the database document data DbTD to the document data TD is SIM, the number of terms included in the term data $TmD_w$ is m, and the weight of an i-th term is $W_i$. Moreover, the number of appearances of the i-th term in the database document data DbTD is $T_i$.

[Formula 3]

$$SIM = \sum_{i=1}^{m} W_i T_i \qquad (3)$$

FIG. 5A shows an example of the calculation results of the similarities of the database document data DbTD[1] to the database document data DbTD[n] to the document data TD. In the example shown in FIG. 5A, the similarity is calculated by Formula 3. FIG. 5A shows the numbers of appearances, in the database document data DbTD, of the terms included in the term data $TmD_w$ (the terms extracted from the document data TD in Step S02). Note that as in the example shown FIG. 4C, the term data $TmD_w$ includes the terms "aaa", "bbb", "ccc", and "ddd", and the weights of the terms "aaa", "ccc", and "ddd" are 1 and the weight of the term "bbb" is 3.

In the example shown in FIG. 5A, the term "aaa" appears ten times, the term "ccc" appears three times, and the term "ddd" appears five times in the database document data DbTD[1]. In contrast, the term "bbb" never appears. Since the weights of the terms "aaa", "ccc", and "ddd" are all 1, the similarity of the database document data DbTD[1] to the document data TD can be 18. In addition, the term "aaa" appears four times and the term "bbb" appears seven times in the database document data DbTD[2]. In contrast, the terms "ccc" and "ddd" never appear. Since the weight of the term "aaa" is 1 and the weight of the term "bbb" is 3, the similarity of the database document data DbTD[2] to the document data TD can be 25.

In the database document data DbTD[n−1], the term "aaa" appears 15 times, the term "bbb" appears 10 times, the term "ccc" appears 20 times, and the term "ddd" appears 25 times. Since the weights of the terms "aaa", "ccc", and "ddd" are 1 and the weight of the term "bbb" is 3, the similarity of the database document data DbTD[n−1] to the document data TD can be 90. Furthermore, the terms "aaa", "bbb", "ccc", and "ddd" never appear in the database document data DbTD[n]. In this case, the similarity of the database document data DbTD[n] to the document data TD can be 0.

In the case where the term extracted from the document data TD appears in the database document data DbTD repeatedly, there is a high possibility that the contents described in the document represented by the document data TD and the contents described in the document represented by the document data DbTD are similar. For example, there is a high possibility that the invention or the like described in the document represented by the document data TD and the invention or the like described in the document represented by the document data DbTD are similar. Thus, by calculating the similarity in consideration of the number of appearances of the same term in the database document data DbTD, the document search system 10 can calculate the similarity with high accuracy.

In the example shown in FIG. 5A, the numbers of appearances of all terms included in the term data $TmD_w$ in the database document data DbTD are taken into consideration in the calculation of the similarity; however, one embodiment of the present invention is not limited thereto. For example, whether or not the number of appearances of the term is taken into consideration may be determined depending on the level of the weight. For example, only a term whose weight is larger than or equal to a predetermined value may be taken into consideration of the number of appearances in the calculation of the similarity. Alternatively, only a term specified by the user of the document search system 10 may be taken into consideration of the number of appearances in the database document data DbTD. Alternatively, the upper limit of the number of appearances that is taken into consideration may be determined. In the case where the upper limit is 10, for example, even a term that appears eleven times or more can be subjected to calculation of similarity on the assumption that the term appears only ten times.

FIG. 5B shows an example of the calculation results of the similarities of the database document data DbTD[1] to the database document data DbTD[n] to the document data TD. Note that as in the example shown FIG. 5A, the term data $TmD_w$ includes the terms "aaa", "bbb", "ccc", and "ddd", and the weights of the terms "aaa", "ccc", and "ddd" are 1 and the weight of the term "bbb" is 3. In addition, the numbers of appearances of the terms "aaa", "bbb", "ccc", and "ddd" in the database document data DbTD[1] to the database document data DbTD[n] are similar to those in the example shown in FIG. 5A.

In the example shown FIG. 5B, the term "bbb" whose weight is 3 is taken into consideration of the number of appearances in the database document data DbTD, and the terms "aaa", "ccc", and "ddd" whose weights are 1 are not taken into consideration of the number of appearances in the database document data DbTD. Specifically, the score of each of the terms "aaa", "ccc", and "ddd" is 1 when the term appears one or more times in the database document data DbTD, and the score is 0 when the term never appears. Meanwhile, the score of the term "bbb" is the product of its weight and the number of appearances in the database document data DbTD. The sum of the scores of the terms "aaa", "bbb", "ccc", and "ddd" is used as the similarity of the database document data DbTD to the document data TD.

In the example shown in FIG. 5B, the similarity of the database document data DbTD[1] to the document data TD can be 3, and the similarity of the database document data DbTD[2] to the document data TD can be 22. In addition, the similarity of the database document data DbTD[n−1] to the document data TD can be 33, and the similarity of the database document data DbTD[n] to the document data TD can be 0.

There is a high possibility that a term having a small weight does not strongly represent the feature of the invention or the like of the document data TD even when the term is extracted from the document data TD. In the case where the reference document data RTD is a written opinion and a point differentiated from a reference described in the written opinion is used as the feature of the invention or the like of the document data TD, for example, there is a possibility that a term having a small weight is used only for argument against violation of descriptive requirements or the like. In this case, there is a possibility that the term having a small weight does not represent the point differentiated from the reference at all. Thus, when a term having a small weight is also taken into consideration of the number of appearances in the database document data DbTD, there is a possibility that the similarity of the database document data DbTD to the document data TD cannot be calculated with high accuracy. Therefore, by determining whether or not the number of appearances of a term is taken into consideration depending on the level of a weight, the similarity of the database document data DbTD, which represents a database document describing an invention or the like having a feature similar to the feature of the invention or the like of the document data TD, to the document data TD can be high. Accordingly, the document search system 10 can calculate the similarity with high accuracy.

After the similarities are calculated by any one of the methods shown in FIG. 4C, FIG. 5A, FIG. 5B, and the like as described above, the document search system 10 outputs the database document data DbTD on the basis of the calculated similarities. For example, the document search system 10 outputs a predetermined number of pieces of database document data DbTD in descending order of similarity levels. Alternatively, for example, the document search system 10 outputs the database document data DbTD whose similarity is greater than or equal to a predetermined value. Accordingly, the document search system 10 can search for the database document data DbTD similar to the document data TD in consideration of the reference document data RTD.

As described above, in the document search method of one embodiment of the present invention, terms are extracted from the document data TD, the extracted terms are weighted on the basis of the reference document data RTD, and the similarity of the database document data DbTD to the document data TD is calculated in consideration of the weights. By calculating the similarity by such a method, the similarity reflecting the feature of the invention or the like described in the document represented by the document data TD can be obtained compared to the case of not weighting the terms extracted from the document data TD, for example. Thus, efficient document search can performed be regardless of the ability of a user, who is a searcher, of the document search system 10.

<3. Document Search Method 2>

FIG. 6A is a flow chart showing an example of a document search method using the document search system 10. In the method shown in FIG. 6A, operations of Step S11 and Step S12 are similar to the operations of Step S01 and Step S02 shown in FIG. 2 and the like.

[Step S13]

After the operation of Step S12, the search execution portion 23 calculates the similarity of the database document data DbTD to the document data TD on the basis of the term data TmD obtained by the weight giving portion 21 by extracting terms from the document data TD. This similarity is referred to as a first similarity. The first similarity can be calculated by a method similar to that in Step S04 shown in FIG. 2 and the like. Here, the weights of all terms included in the term data TmD can be the same. That is, for example, the weights of all terms can be 1. Accordingly, it can be said that the first similarity is a similarity calculated regardless of the reference document data RTD.

Operations of Step S14 and Step S15 are similar to the operations of Step S03 and Step S04 shown in FIG. 2 and the like.

[Step S16]

After the operation of Step S15, the search execution portion 23 compares the first similarity and a second similarity. For example, the database document data DbTD in which the second similarity is higher than the first similarity is provided for the user of the document search system 10. For example, the database document data DbTD in which a difference between the second similarity and the first similarity is greater than or equal to a predetermined value is provided for the user of the document search system 10.

Alternatively, the search execution portion 23 generates first ranking of the database document data DbTD in descending order of the first similarity and second ranking of the database document data DbTD in descending order of the second similarity, for example. Then, the database document data DbTD whose rank in the second ranking is different from the rank in the first ranking is provided for the user of the document search system 10. For example, the database document data DbTD whose rank in the second ranking rank is higher than the rank in the first ranking is provided for the user of the document search system 10. For example, the database document data DbTD whose rank in the second ranking rank is higher than the rank in the first ranking by a predetermined value is provided for the user of the document search system 10. The above is the example of the document search method shown in FIG. 6A.

FIG. 6B shows an example of the calculation results of the first and second similarities of the database document data DbTD[1] to the database document data DbTD[n] to the document data TD. Here, as in the case shown FIG. 4C, the terms included in the term data TmD (i.e., the terms extracted from the document data TD in Step S12) are the four terms, "aaa", "bbb", "ccc", and "ddd".

The first and second similarities are calculated by Formula 2. Here, the first similarity is calculated using the four terms whose weights are all 1 and the second similarity is calculated using the four terms whose weights are the values listed in FIG. 4B1. In FIG. 6B, the terms included in the database document data DbTD are denoted by "○", and the terms not included in the database document data DbTD are denoted by "x". Whether each of the terms is included in the database document data DbTD[1] to the database document data DbTD[n] is the same as that in the example shown in FIG. 4C.

In the example shown in FIG. 6B, the first similarity of the database document data DbTD[1] to the document data TD can be 3 and the second similarity can also be 3. The first similarity of the database document data DbTD[2] to the document data TD can be 2 and the second similarity can be 4. The first similarity of the database document data DbTD [n−1] to the document data TD can be 4 and the second similarity can be 6. The first similarity of the database document data DbTD[n] to the document data TD can be 0 and the second similarity can also be 0. Accordingly, in the database document data DbTD[2] and the database document data DbTD[n−1], the second similarity is higher than the first similarity. FIG. 6B shows an example in which the second similarity of the database document data DbTD[2] and the second similarity of the database document data DbTD[n−1] are surrounded by circles to be emphasized.

<4. Document Search Method 3>

In the document search method of one embodiment of the present invention, texts included in the reference document data RTD are classified into the first text 31 and the second text 32 in order to weight terms included in the term data TmD (terms extracted from the document data TD), and the classification may be performed using machine learning. For example, the weighting can be performed using algorithm such as Naive Bayes, Support Vector Machine, or Conditional Random Fields (CRFs). Alternatively, a circuit in which a neural network is formed can be provided for the weight giving portion 21 and the weighting can be performed using the neural network. In the case where the term extracted from the document data TD is converted into a distributed representation in order to perform machine learning, Bidirectional Encoder Representations from Transformer (BERT) capable of obtaining different distributed representations from the same term depending on context may be employed. In the case where the document search system 10 has a function of performing machine learning, the weight giving portion 21 can have a function of performing machine learning, for example.

[Learning]

An example of a learning method is described. First, learning reference document data LRTD is prepared. The learning reference document data LRTD can be the same kind of document data as the reference document data RTD. In other words, the learning reference document data LRTD can be a written opinion, for example (see FIG. 7A).

Next, texts included in the learning reference document data LRTD are labeled. The learning reference document data LRTD including the labeled texts is learning reference document data $LRTD_{LB}$ (see FIG. 7A).

For example, a label A is applied to a text strongly representing the feature of an invention or the like of document data (e.g., a scope of claims) linked to the learning reference document data LRTD, and a label B is applied to each of the other texts. In other words, the texts included in the learning reference document data LRTD are classified into a first text and a second text, and the label A can be applied to the first text and the label B can be applied to the second text. The labeling can be performed for each paragraph, for example. That is, the label A can be applied to a paragraph including the text strongly representing the feature of the invention or the like of the document data linked to the learning reference document data LRTD, and the label B can be applied to each of the other paragraphs.

Note that in the case where the labeling is performed by the above method, the text to which the label A is applied preferably includes a term included in the document data linked to the learning reference document data LRTD. This allows accurate weighting of the term included in the term data TmD. Accordingly, the document search system 10 can calculate a similarity with high accuracy. Although the case where two kinds of labels (the label A and the label B) are applied to the learning reference document data LRTD is described above, three or more kinds of labels may be applied.

Note that a term included in both the learning reference document data LRTD and the document data linked to the learning reference document data LRTD may be replaced with a predetermined character string or the like. Accordingly, overtraining can be inhibited.

Next, the learning reference document data LRTD is input to the weight giving portion 21. The weight giving portion 21 performs learning so that output data is close to the learning reference document data $LRTD_{LB}$. Specifically, the learning is performed so that a label applied to the learning reference document data LRTD is close to a label applied to the learning reference document data $LRTD_{LB}$. Thus, the weight giving portion 21 can obtain a learning result P (see FIG. 7B). For example, in the case where the weight giving portion 21 includes a circuit in which a neural network is formed, the learning result P can be a weight coefficient for each neuron included in the neural network. Accordingly, it can be said that the weight giving portion 21 can perform supervised learning.

[Weighting of Terms Extracted from Document Data TD]

In Step S03 shown in FIG. 2 and the like or Step S14 shown in FIG. 6A and the like, when the reference document data RTD is input to the weight giving portion 21 that has performed the learning by the above-described method, labeling based on the learning result P is performed. For example, the label A can be applied to the text strongly representing the feature of the invention or the like of the document data TD, and the label B can be applied to each of the other texts. The labeled reference document data RTD is reference document data $RTD_{LB}$ (see FIG. 8). Accordingly, the texts included in the document represented by the reference document data RTD can be classified. For example, the text to which the label A is applied can be the first text 31 and the text to which the label B is applied can be the second text 32.

After that, the weight giving portion 21 weights the terms included in the term data TmD. The weight of the term included in the text to which the label A is applied is set larger than the weight of the term not included in the text to which the label A is applied. By the above method, weighting of the terms extracted from the document data TD can be performed.

<5. Document Search Method 4>

A method for weighting terms included in the term data TmD (terms extracted from the document data TD) using a neural network is not limited to the above method. Examples of a learning method of a neural network and a method for weighting the terms extracted from the document data TD that are different from the above-described methods will be described below. Note that for algorithm of learning or the like, Naive Bayes, Support Vector Machine, CRFs, or the like can be used as in the above-described method.

[Learning]

An example of a learning method of a neural network will be described. First, learning document data LTD is prepared. In addition, the learning reference document data LRTD linked to the learning document data LTD is prepared.

The learning document data LTD can be document data of the same kind as the document data TD. In other words, the learning document data LTD can be a scope of claims, for example. Moreover, as described above, the learning reference document data LRTD can be document data of the same kind as the reference document data RTD. In other words, the learning reference document data LRTD can be a written opinion against reasons for refusal of patent application or the like of the learning document data LTD.

Figure 9:
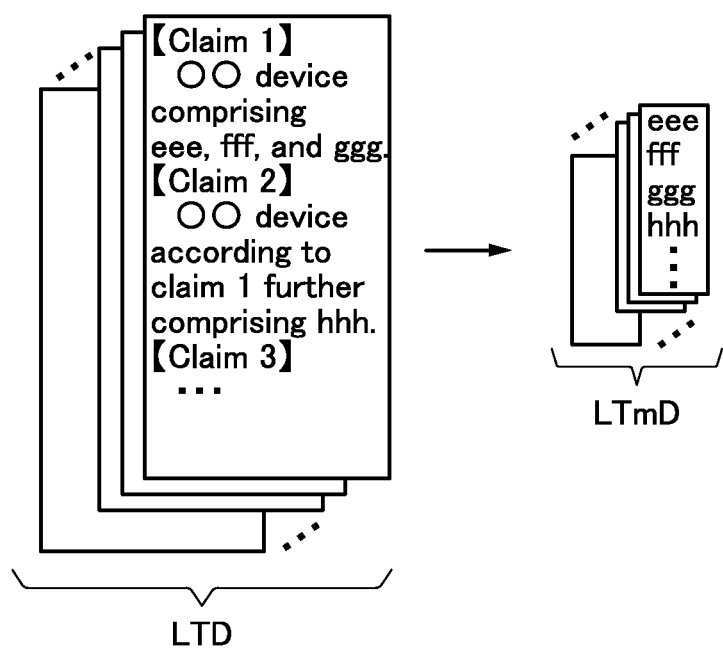
FIG. 9 is a schematic view for describing an example of a document search method.
Figure 10A:
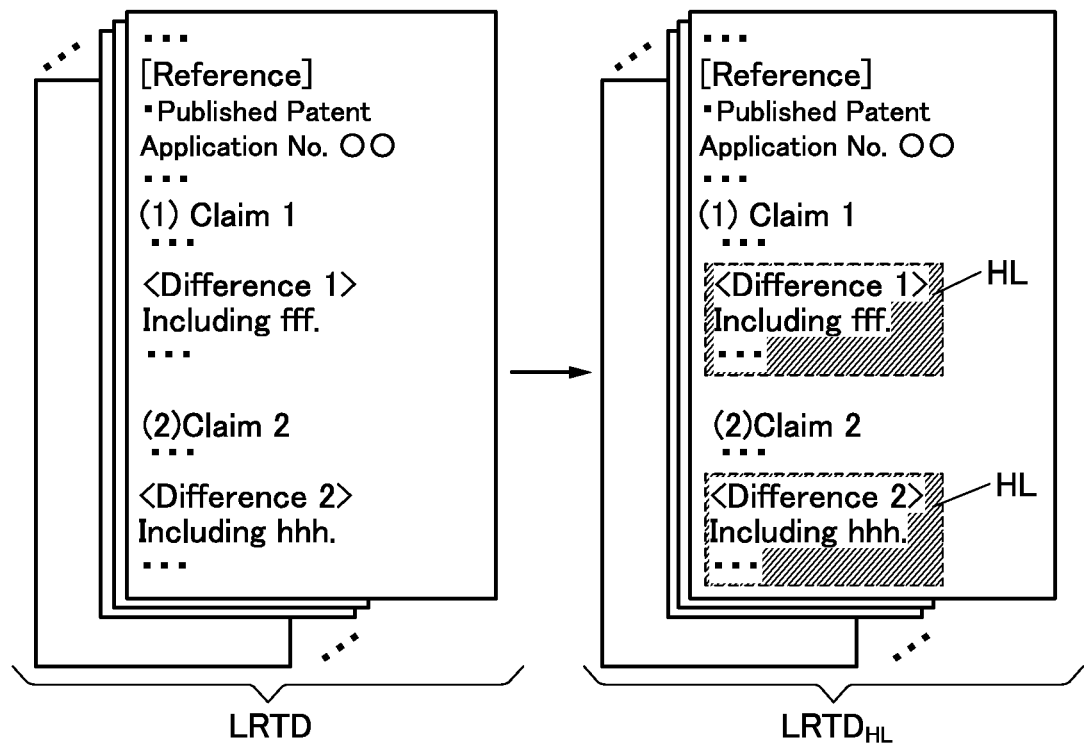
FIG. 10A and FIG. 10B are schematic views for describing an example of a document search method.
Figure 10B:
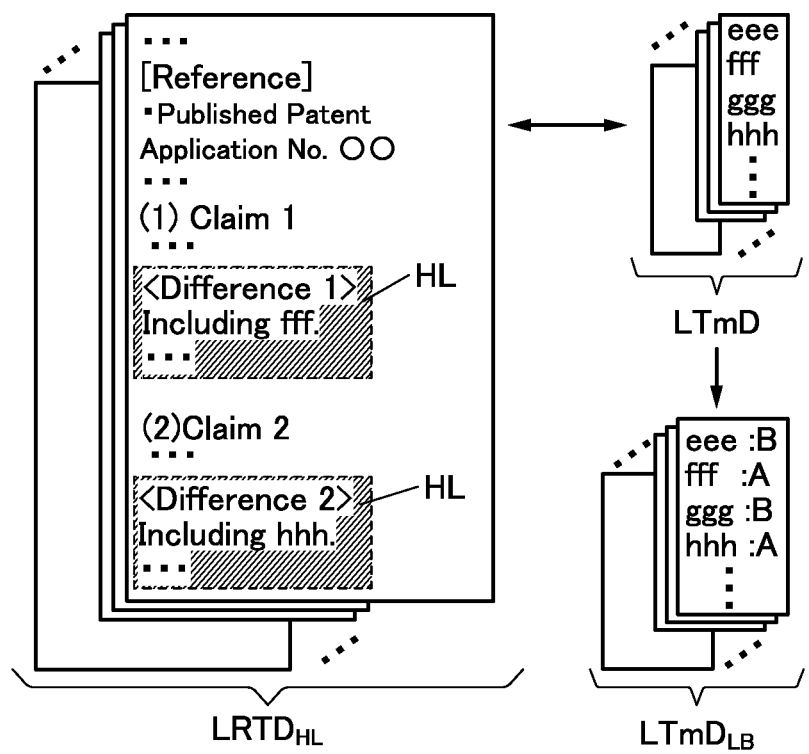
Figure 11:
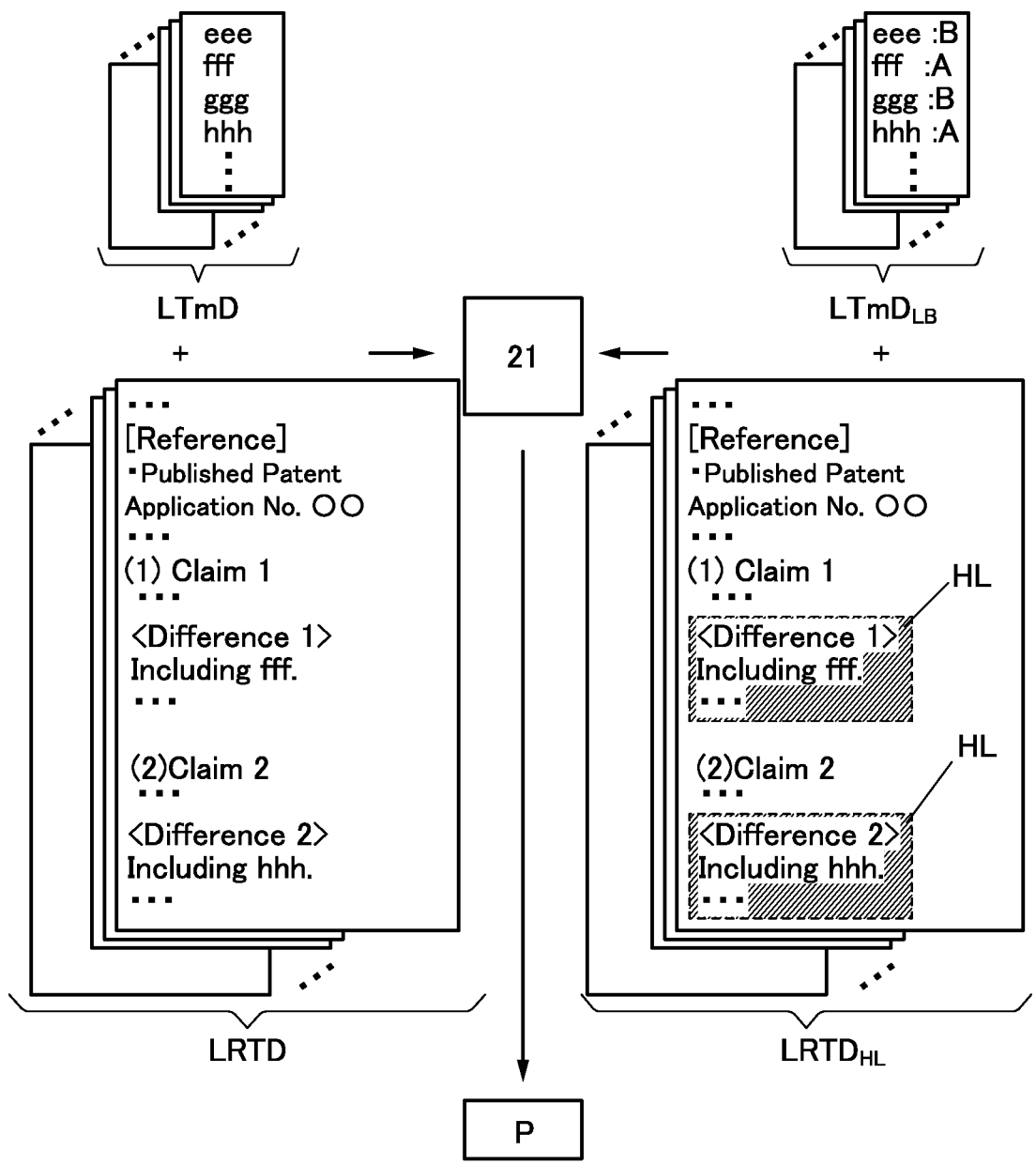
FIG. 11 is a schematic view for describing an example of a document search method.
Figure 12:
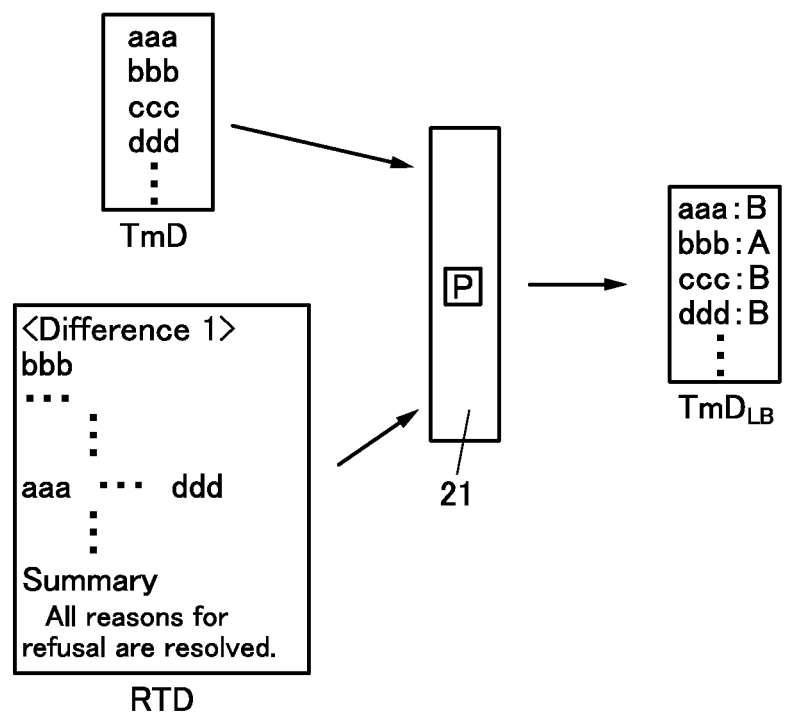
FIG. 12 is a schematic view for describing an example of a document search method.

Next, terms are extracted from the learning document data LTD, whereby learning term data LTmD is obtained (see FIG. 9). The extraction of the terms from the learning document data LTD can be performed by a method similar to that of the extraction of the terms from the document data TD by the weight giving portion 21. The terms are extracted by performing morphological analysis on the learning document data LTD, for example. Among the extracted terms, a noun can be determined as a term included in the learning term data LTmD, for example, and all nouns can be determined as terms included in the learning term data LTmD, for example.

In addition, texts represented by the learning reference document data LRTD are classified. For example, the texts represented by the learning reference document data LRTD are classified into the first text and the second text. For example, among the texts represented by the learning reference document data LRTD, a text strongly representing the feature of an invention or the like of the learning document data LTD is highlighted. The highlighted text can be the first text, and the other texts can be the second texts. The learning reference document data LRTD including the highlighted text is learning reference document data $LRTD_{HL}$ (see FIG. 10A). In the learning reference document data $LRTD_{HL}$ shown in FIG. 10A, a text included in a highlighted portion HL is the highlighted text.

Next, the terms included in the learning term data LTmD are labeled on the basis of the learning reference document data $LRTD_{HL}$. For example, among the terms included in the learning term data LTmD, the label A can be applied to the term included in the highlighted text, i.e., the first text, and the label B can be applied to each of the other terms. Thus, among the terms included in the learning term data LTmD, the label A can be applied to the term included in a text strongly representing the feature of the invention or the like of the learning document data LTD, and the label B can be applied to each of the other terms. The learning term data LTmD including the labeled term is learning term data $LTmD_{LB}$ (see FIG. 10B). Although the case where two kinds of labels (the label A and the label B) are applied to the terms included in the learning term data LTmD is described above, three or more kinds of labels may be applied.

Next, the learning term data LTmD and the learning reference document data LRTD are input to the weight giving portion 21. The weight giving portion 21 performs learning so that output data is close to the learning term data $LTmD_{LB}$ and the learning reference document data $LRTD_{HL}$. Specifically, the learning is performed so that a label applied to the term included in the learning term data LTmD input to the neural network is close to a label applied to the term included in the learning term data $LTmD_{LB}$. Thus, the weight giving portion 21 can obtain the learning result P (see FIG. 11). For example, in the case where the weight giving portion 21 includes a circuit in which a neural network is formed, the learning result P can be a weight coefficient for each neuron included in the neural network. Accordingly, the weight giving portion 21 can perform supervised learning.

[Weighting of Terms Extracted from Document Data TD]

In Step S03 shown in FIG. 2 and the like or Step S14 shown in FIG. 6A and the like, when the term data TmD and the reference document data RTD are input to the neural network that has performed the learning by the above-described method, labeling based on the learning result P is performed. For example, the label A can be applied to the term included in the text that is included in the reference document data RTD and strongly represents the feature of the invention or the like of the document data TD, and the label B can be applied to each of the other terms. The term data including the labeled term is the term data $TmD_{LB}$ (see FIG. 12).

After that, the weight giving portion 21 weights the terms included in the term data $TmD_{LB}$. The weight of the term to which the label A is applied is set larger than the weight of the term to which the label B is applied. By the above method, weighting of the terms extracted from the document data TD can be performed.

REFERENCE NUMERALS

S01: step, S02: step, S03: step, S04: step, S11: step, S12: step, S13: step, S14: step, S15: step, S16: step, 10: document search system, 11: input portion, 15: memory portion, 17: database, 19: output portion, 20: processing portion, 21: giving portion, 23: search execution portion, 31: text, 32: text

The invention claimed is:

1. A document search system comprising a database and a hardware processor,
wherein the database is configured to store database document data,
wherein the hardware processor is configured to:
receive first document data and second document data;
extract a plurality of terms from the first document data;
weight at least one of the plurality of extracted terms on a basis of the second document data;
calculate a similarity of the database document data to the first document data on a basis of the at least one weighted term; and
output the calculated similarity,
wherein, after the plurality of terms are extracted, texts included in a document represented by the second document data are classified using machine learning,
wherein first learning document data is input to a processing portion of the hardware processor configured to perform the machine learning,
wherein the first document data represents a scope of claims of a patent application,
wherein the second document data represents a written opinion against a reason for refusal of the patent application, and
wherein the second document data represents a document which includes content described in a document represented by the first document data.

2. The document search system according to claim 1,
wherein the hardware processor is configured to classify texts included in the document represented by the second document data into a first text and a second text, and
wherein the hardware processor is configured to set a weight of the term included in the first text larger than a weight of the term not included in the first text among the terms extracted from the first document data.

3. The document search system according to claim 2,
wherein the hardware processor is configured to perform machine learning, and
wherein the hardware processor is configured to perform the classification of texts on the basis of a learning result of the machine learning.

4. The document search system according to claim 3,
wherein the machine learning is performed so that data output from the hardware processor becomes closer to second learning document data,
wherein the first learning document data is the same kind of document data as the second document data, and
wherein the second learning document data is document data obtained by labeling the first learning document data.

5. The document search system according to claim 4, wherein the hardware processor is configured to extract the plurality of terms using morphological analysis.

6. The document search system according to claim 3, wherein the hardware processor is configured to extract the plurality of terms using morphological analysis.

7. The document search system according to claim 2, wherein the hardware processor is configured to extract the plurality of terms using morphological analysis.

8. The document search system according to claim 1, wherein the hardware processor is configured to extract the plurality of terms using morphological analysis.

9. A method for searching for a document using a document search system comprising a database and a hardware processor in which database document data is stored in the database,
the method comprising:
inputting, to the hardware processor, first document data and second document data;
extracting, by the hardware processor, a plurality of terms from the first document data;
weighting, by the hardware processor, at least one of the plurality of extracted terms on a basis of the second document data;
calculating, by the hardware processor, a similarity of the database document data to the first document data on a basis of the at least one weighted term; and
outputting, by the hardware processor, the calculated similarity,
wherein, after the plurality of terms are extracted, texts included in a document represented by the second document data are classified using machine learning,
wherein first learning document data being input to a processing portion of the hardware processor configured to perform processing using the machine learning,
wherein the first document data represents a scope of claims of a patent application,
wherein the second document data represents a written opinion against a reason for refusal of the patent application, and
wherein the second document data represents a document which includes content described in a document represented by the first document data.

10. The method according to claim 9,
wherein the texts are classified into a first text and a second text, and
wherein the weighting is performed so that a weight of the term included in the first text is larger than a weight of the term not included in the first text among the plurality of terms extracted from the first document data.

11. The method according to claim 10, wherein the extraction of the plurality of terms is performed using morphological analysis.

12. The method according to claim 9,
wherein the machine learning is performed so that data output from the processing portion becomes closer to second learning document data,
wherein the first learning document data is the same kind of document data as the second document data, and
wherein the second learning document data is document data obtained by labeling the first learning document data.

13. The method according to claim 12, wherein the extraction of the plurality of terms is performed using morphological analysis.

14. The method according to claim 9, wherein the extraction of the plurality of terms is performed using morphological analysis.

15. The method according to claim 9, wherein the extraction of the plurality of terms is performed using morphological analysis.

* * * * *